United States Patent
Stiekes

(10) Patent No.: US 9,049,236 B2
(45) Date of Patent: Jun. 2, 2015

(54) DISTRIBUTED NETWORK INSTRUMENTATION SYSTEM

(75) Inventor: Bryan Stiekes, Pontiac, MI (US)

(73) Assignee: Hewlett-Packard Development Company, L. P., Houston, TX (US)

(*) Notice: Subject to any disclaimer, the term of this patent is extended or adjusted under 35 U.S.C. 154(b) by 99 days.

(21) Appl. No.: 13/880,078

(22) PCT Filed: Oct. 22, 2010

(86) PCT No.: PCT/US2010/053713
§ 371 (c)(1),
(2), (4) Date: Apr. 18, 2013

(87) PCT Pub. No.: WO2012/054055
PCT Pub. Date: Apr. 26, 2012

(65) Prior Publication Data
US 2013/0212641 A1    Aug. 15, 2013

(51) Int. Cl.
*H04L 29/06* (2006.01)

(52) U.S. Cl.
CPC ............ *H04L 63/20* (2013.01); *H04L 63/0227* (2013.01); *H04L 63/04* (2013.01); *H04L 63/101* (2013.01); *H04L 63/1416* (2013.01); *H04L 63/306* (2013.01)

(58) Field of Classification Search
CPC ..... H04L 63/20; H04L 63/0227; H04L 63/04; H04L 63/1416; H04L 63/306; H04L 63/101
USPC ........................................................... 726/1
See application file for complete search history.

(56) References Cited

U.S. PATENT DOCUMENTS

| 6,393,474 | B1  |   | 5/2002  | Eichert et al. |         |
|-----------|-----|---|---------|----------------|---------|
| 6,941,472 | B2  | * | 9/2005  | Moriconi et al.| 726/11  |
| 7,526,541 | B2  |   | 4/2009  | Roese et al.   |         |
| 7,636,935 | B2  | * | 12/2009 | Palekar et al. | 726/1   |
| 8,316,441 | B2  | * | 11/2012 | Ballester et al.| 726/22 |
| 8,438,647 | B2  | * | 5/2013  | Jevans         | 726/26  |
| 8,479,279 | B2  | * | 7/2013  | Li et al.      | 726/15  |
| 8,505,075 | B2  | * | 8/2013  | Jevans et al.  | 726/4   |
| 8,621,565 | B2  | * | 12/2013 | Ohta           | 726/2   |
| 8,695,058 | B2  | * | 4/2014  | Batchu et al.  | 726/1   |
| 8,793,787 | B2  | * | 7/2014  | Ismael et al.  | 726/22  |
| 2004/0165588 | A1 | * | 8/2004  | Pandya        | 370/389 |
| 2006/0236363 | A1 | * | 10/2006 | Heard et al.  | 726/1   |
| 2010/0125897 | A1 | * | 5/2010  | Jain et al.   | 726/7   |
| 2011/0314261 | A1 | * | 12/2011 | Brucker et al.| 712/207 |

OTHER PUBLICATIONS

Pan et al., "Semantic access control for information interoperation", Jun. 2006.*
Bekker, Scott; "3Com Weighs in with Server NIC that Offloads Encryption—Product Announcement"; Apr. 26, 2000; 3 pages.
Napatech; "Intelligent Real-time Network Adapters 2-Port 10 G Ethernet PCIe"; 2009; 4 Pages.
PCT; Notification of Transmittal of the International Search Report and the Written Opinion of the International Searching Authority, or the Declaration; PCT/US2010/053713; mailed Jul. 25, 2011; 10 pages.

* cited by examiner

*Primary Examiner* — Yonas Bayou
(74) *Attorney, Agent, or Firm* — Wagner Blecher

(57) ABSTRACT

A distributed network instrumentation system (100) includes a security management station (110) including a global network policy decomposer (112) configured to decompose global network security policies to local security policies for distributed policy enforcement, and a network interface (220) communicatively coupled to a compute platform (200). The network interface (220) is configured to off-load processing of the local security policies and end-to-end encryption from an operating system (210) of the compute platform (200) for facilitating network instrumentation.

12 Claims, 2 Drawing Sheets

DISTRIBUTED NETWORK INSTRUMENTATION SYSTEM

BACKGROUND

Network instrumentation and policy enforcement depends on network visibility to (1) perform standard application troubleshooting within hosted environments, (2) classify traffic patterns and identify behaviors which are deemed risky, and (3) identify traffic and network protocols that are permitted to traverse perimeters between zones of differing trust. However, end-to-end encryption negatively affects the network instrumentation and policy enforcement by decreasing the network visibility.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
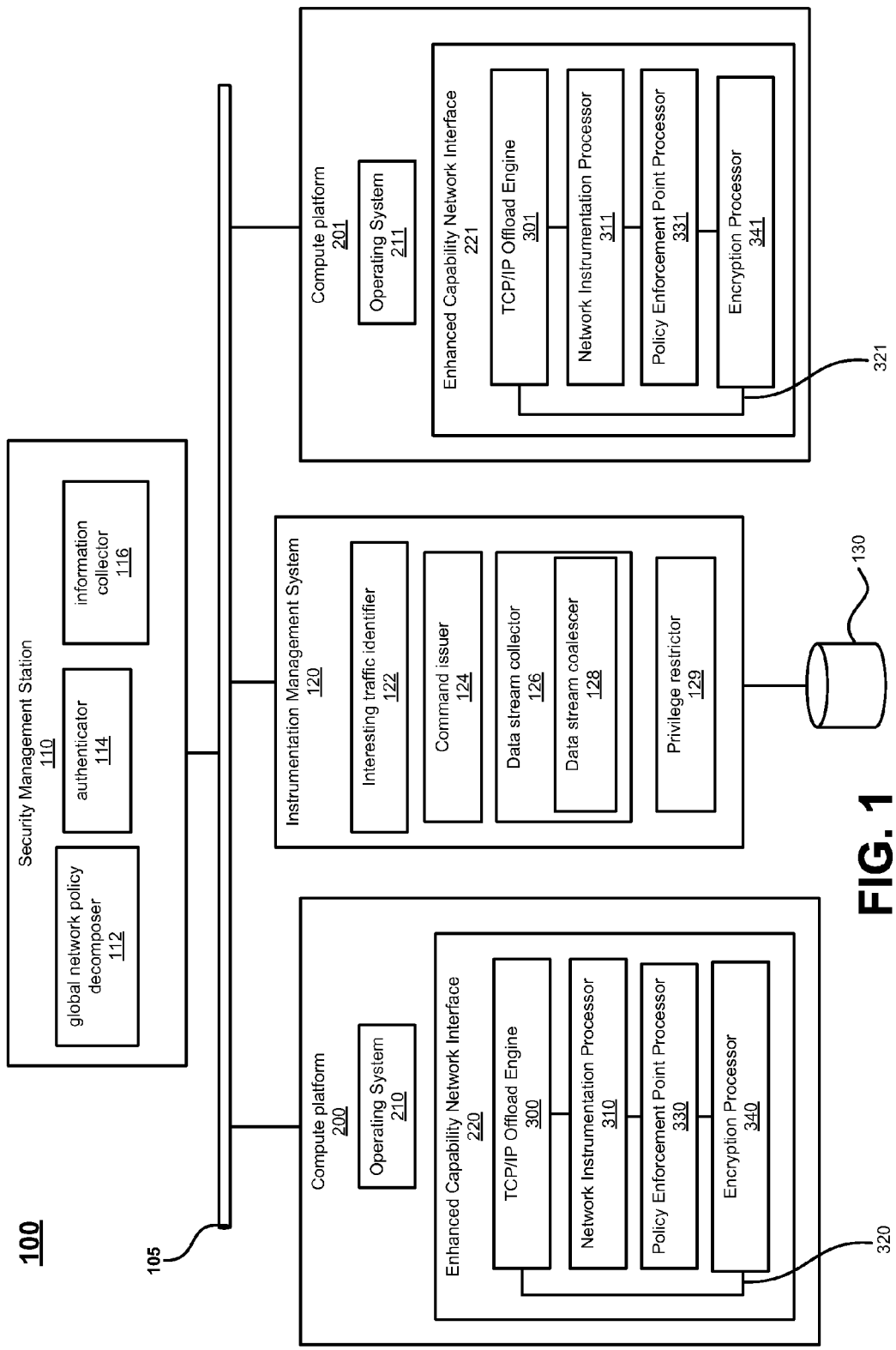
FIG. 1 illustrates an example of a distributed network instrumentation system, in accordance with an embodiment of the present invention.

FIG. 1 depicts distributed network instrumentation system (DNIS) 100, in accordance to an embodiment of the present invention. In general, DNIS 100 is utilized for policy enforcement, wherein the policy enforcement is applied before data packets are encrypted in an end-to-end encryption or IP version 6 environment.

DNIS 100 includes security management station (SMS) 110, instrumentation management system (IMS) 120 and compute platforms 200-201 communicatively coupled via local area network (LAN) 105. It should be appreciated that DNIS 100 can include any number of compute platforms or end nodes.

The discussion below will first describe the structure and components of DNIS 100. The discussion will then describe the functionality of the structure and components during operation of DNIS 100.

SMS 110 includes global network policy decomposer (GNPD) 112, authenticator 114 and information collector 116.

IMS 120 includes interesting traffic identifier 122, command issuer 124, data stream collector 126, data stream coalescer 128 and privilege restrictor 129.

Compute platform 200 includes operating system 210 and enhanced capability network interface (ECNI) 220. ECNI 220 includes TCP/IP offload engine (TOE) 300, network instrumentation processer (NIP) 310, policy enforcement point processor (PEPP) 330 and encryption processor 340.

Similarly, compute platform 201 includes operating system 211 and ECNI 221. ECNI 221 includes TOE 301, NIP 311, PEPP 331 and encryption processor 341.

For brevity and clarity, the discussion below will describe compute platform 200 and its constituent components rather than compute platform 201 and/or any other compute platforms. However, it is to be understood that compute platform 201 and any other compute platforms similar to compute platform 200 include similar structure and functionality as compute platform 200.

Authenticator 114 of SMS 110 is configured for authenticating ECNI 220 via a protocol that is reliably connected. A reliable connection between SMS 110 and ECNI 220 assures that events identified at the edge of the network or compute platforms are collected back at SMS 110. In various embodiments, a reliably connected protocol can be, but is not limited to, InfiniBand, remote direct memory access (RDMA), lossless Ethernet and the like.

GNPD 112 of SMS 110 is configured to decompose global network security policies to local security policies for distributed policy enforcement. The local security policies are locally relevant to each individual compute platform. Moreover, GNPD 112 allows for continued management of policy at an aggregate level. The local security policies are transmitted to PEPP 330 of ECNI 220.

In one embodiment, GNPD 112 decomposes global network security policies into locally relevant light footprint enforcement rules (e.g., access control lists (ACLs), intrusion detection profiles). In another embodiment, GNPD 112 decomposes global network security policies in response to compute platform 200 being authenticated/registered via authenticator 114.

It should be appreciated that a security administrator (not shown) can define global security policies within SMS 110. Global security policies can include, but are not limited to, resource groups that include end station identifiers (e.g., network address/subnets), permitted behaviors (e.g., protocols, direction of communication flows) and the like.

Information collector 116 of SMS 110 is configured to collect information such as, forensic logging and audits from ECNI 220 in a reliable and secure fashion. For example, information collector 116 collects information regarding packet analysis, deep packet inspection, behavior analysis of traffic, statistical analysis examined for anomaly detection, etc.

Moreover, SMS 110 is configured to recompose the collected information into aggregate and network levels.

In general, IMS 120 is configured for reconstituting communication flows and analyzing the communication flows in real-time (or near real-time) in a packet analysis system. In other words, IMS 120 facilitates in inserting a path in ECNI 220 that captures traffic, redirects the traffic to IMS 120 that will then reconstitute all data streams from all the associated compute platforms into an analyzable traffic flow that can then be analyzed in IMS 120 or some other end node.

IMS 120 also facilitates in inserting reactive trouble shooting tools into end-to-end encryption communication flow to do payload analysis, should it be deemed necessary.

Interesting traffic identifier 122 of IMS 120 is configured to identify interesting traffic for ECNI 220. In particular, the identified interesting traffic is distributed to NIP 310. For example, a network administrator (not shown) can log into IMS 120 and identify the traffic of interest. Interesting traffic can be identified based on elements such as network address, subnet, system name, virtual LAN, application group, and/or protocol.

Command issuer 124 is configured to issue commands to ECNI 220. In particular, the commands are issued to NIP 310. The commands are associated with the identified interesting traffic. For example, the network administrator (after identifying the traffic of interest) identifies the action to be taken if the interesting traffic passes through ECNI 220. The commands issued by command issuer 124 can be associated with measuring, monitoring, mirroring, etc.

In one embodiment, IMS 120 identifies a community of interest by querying a source of truth (e.g., configuration management database 130) and issues the relevant commands via command issuer 124 to take the defined action to those systems which are identified as the defined community of interest.

Data stream collector 126 is configured to collect individual data streams from a plurality of compute platforms or end nodes. In other words, once IMS 120 distributes the appropriate commands within the identified community of interest, data stream collector 126 collects the individual reporting streams. The individual reporting streams can include, but are not limited to, measured, monitored or mirrored data. Accordingly, in one embodiment, IMS 120 via data stream collector 126 facilitates in reducing traffic in DNS 100 by only capturing the interesting data transmitted from the plurality of compute platforms.

Data stream coalescer 128 is configured to coalesce the individual data streams from the plurality of compute platforms or end nodes. Then the coalesced data streams are stored into an archive for analysis.

Privilege restrictor 129 is configured to restrict privilege of individual network administrators. In particular, privilege restrictor 129 facilitates in limiting the network administrator's ability to perform actions on individual compute platforms. Additionally, privilege restrictor 129 facilitates in limiting the actions (e.g., measure, monitor, mirror) that an individual administrator can take. Also, the restriction is extended to specific types of data against which a network administrator can take.

ECNI 220 is configured to off-load processing of the local security policies and end-to-end encryption from operating system 210 for facilitating network instrumentation. ECNI 220 is communicatively coupled to compute platform 200. In various embodiments, the purpose of ECNI 220 is to push end-to-end encryption, take TCP/IP offload, and provide a hardware optimized platform to allow distributed policy enforcement for network instrumentation.

TOE 300 of ECNI 220 is configured to offload TCP/IP from OS 210, as described above.

Encryption processor 340 is configured to receive packets destined to compute platform 200 via LAN 100. Encryption processor 340 is responsible for the offloading of the encryption/decryption of IP packets. Encryption processor 340 decrypts the data packets and presents the unencrypted data packets to the PEPP 330.

PEPP 330 is responsible for the application of local security policies developed and configured by SMS 110 to which ECNI 220 is registered. The local security policies are highly optimized. The locally relevant enforcement rules can include, but are not limited to, access control lists and intrusion prevention profiles.

PEPP 330 matches traffic that traverses PEPP 330 against the configured enforcement rules and forwards the traffic that is permitted by those rules to NIP 310. Moreover, forensic logging is transmitted to SMS 110 via a reliably connected protocol.

NIP 310 is configured for measuring, monitoring, and/or mirroring traffic which has been identified as interesting by interesting traffic identifier 122 of IMS 120. As described above, traffic is identified as interesting based on network address/subnet, virtual LAN, protocol port, and/or other elements. Measurement and monitoring reports and mirrored data are encrypted and transmitted to IMS 120 via a reliable, low latency connection.

Fast path 320 preserves performance in policy enforcement and network instrumentation by allowing authorized bypass of individual packets. For example, a flow can be permitted based on analyzing the first few packets in the flow. If the flow is permitted/authorized, then the flow can be directed through the fast path. Thus, resources are conserved on PEPP 330.

It should be appreciated that DNIS 100, in particular, the combination of SMS 110, IMS 120 and ECNI 220 (1) enables management of policy globally via a mechanism which is consistent with traditional policy enforcement, decomposing and automating ACL generation and application outside of security administrator visibility, and (2) enables a centrally, highly flexible network instrumentation approach that is not dependent on the network fabric's ability to identify and mirror interesting traffic Moreover, the combination of SMS 110, IMS 120 and ECNI 220 inter-operates with and within legacy environments by not altering the fundamental communication protocols (rather it only modifies where security controls are implemented). Also, the management systems may be extended to provide holistic management of legacy security perimeter control across ECNI and non-ECNI enabled infrastructure elements.

Figure 2:
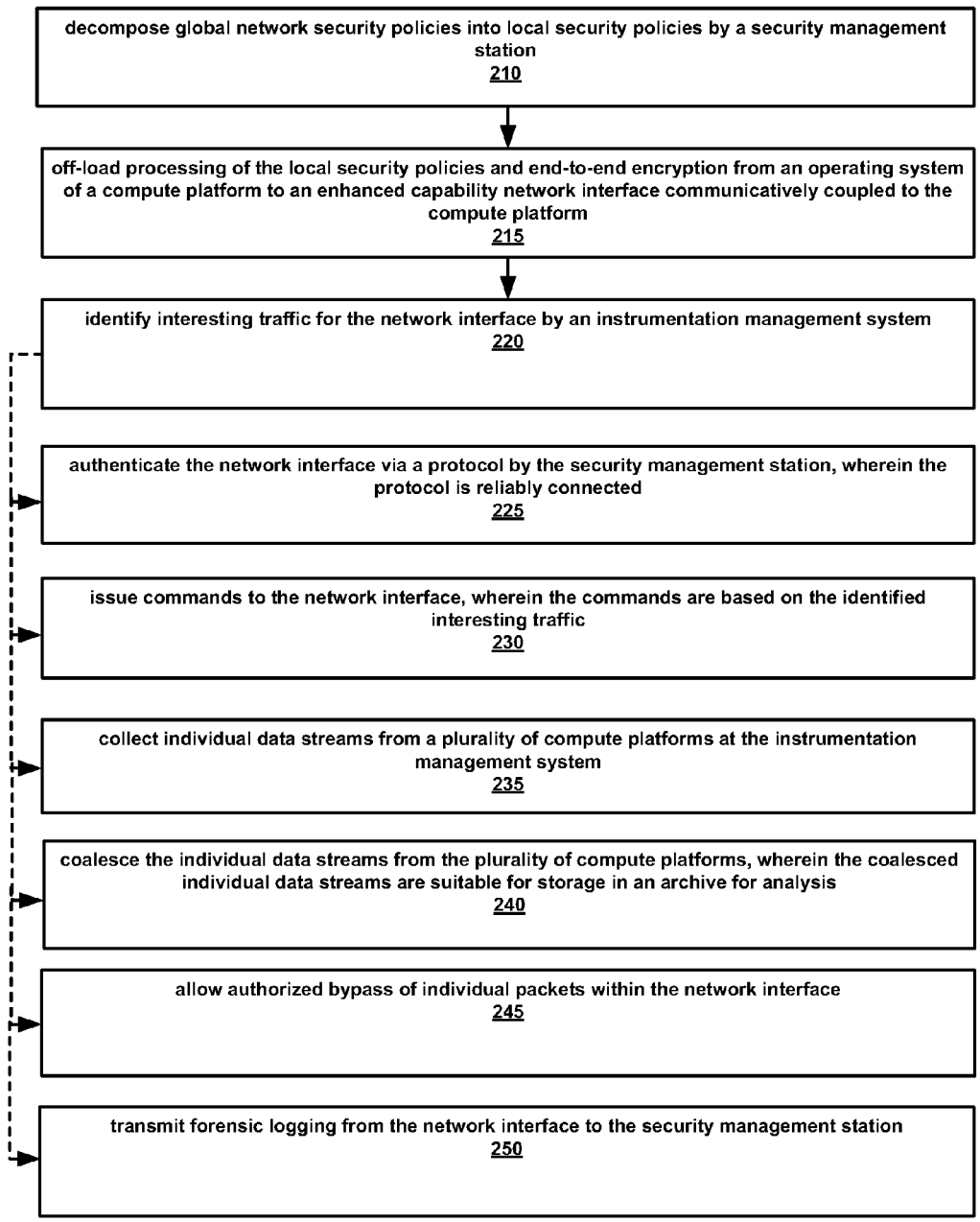
FIG. 2 illustrates an example of a method for distributed policy enforcement and network instrumentation, in accordance with embodiments of the present invention.

FIG. 2 depicts a method 200 for distributed policy enforcement and network instrumentation, in accordance with an embodiment of the present invention. In one embodiment, method 200 is carried out by processors and electrical components under the control of computer readable and computer executable instructions. The computer readable and computer executable instructions reside, for example, in a non-transitory computer readable data storage medium such as computer readable/usable volatile or non-volatile memory. However, the computer readable and computer executable instructions may reside in any type of computer readable storage medium. In some embodiments, method 200 is performed at least by the combination of SMS 110, IMS 120 and ECNI 220. In one such embodiment, the computer readable and executable instructions are thus carried out by a process and/or other components of the combination of SMS 110, IMS 120 and ECNI 220.

At 210, global network security policies are decomposed into local security policies by SMS 110. At 215, processing of local security policies and end-to-end encryption are offloaded from OS 210 of compute platform 200 to ECNI 220 communicatively coupled to compute platform 200. At 220, interesting traffic is identified for ECNI 22 by IMS 120.

At 225, ECNI 220 is authenticated via a reliably connected protocol by SMS 110. At 230, commands to ECNI 220 are issued, wherein the commands are based on the identified interesting traffic. At 235, individual data streams are collected from a plurality of compute platforms at MS 120. At 240, the individual data streams from the plurality of compute platforms are coalesced. Then the coalesced data streams are stored into an archive for analysis. At 245, authorized bypass of individual packets within ECNI 220 is allowed. At 250, forensic logging from ECNI 220 is transmitted to SMS 110.

Various embodiments of the present invention are thus described. While the present invention has been described in particular embodiments, it should be appreciated that the present invention should not be construed as limited by such embodiments, but rather construed according to the following claims.

The invention claimed is:

1. A distributed network instrumentation system (100) comprising:
    a security management station (110) comprising a global network policy decomposer (112) configured to decompose global network security policies to local security policies for distributed policy enforcement;
    a network interface (220) communicatively coupled to a compute platform (200), wherein said network interface (220) is configured to off-load processing of said local security policies and end-to-end encryption from an operating system (210) of said compute platform for facilitating network instrumentation; and
    a command issuer (124) configured to issue commands to said network interface (220), wherein said commands are associated with interesting traffic.

2. The distributed network instrumentation system of claim 1, wherein said network interface further comprises: a network interface authenticator (114) configured to authenticate said network interface (220) via a reliably connected protocol.

3. The distributed network instrumentation system of claim 1, further comprising: an instrumentation management system (120) comprising:
    an interesting traffic identifier (122) configured to identify said interesting traffic for said network interface (220).

4. The distributed network instrumentation system of claim 3, where said instrumentation management system further comprises: a data stream collector (126) configured to collect individual data streams from a plurality of compute platforms (200, 201).

5. The distributed network instrumentation system of claim 4, where said instrumentation management system further comprises: a data stream coalescer (128) configured to coalesce said individual data streams from said plurality of compute platforms (200, 201), wherein said coalesced individual data streams are suitable for storage in an archive for analysis.

6. The distributed network instrumentation system of claim 1, wherein said network interface comprises: a fast path (320) configured to allow authorized bypass of individual packets within said network interface (220).

7. A method for distributed policy enforcement and network instrumentation (200), said method comprising:
    decomposing global network security policies into local security policies by a security management station (210);
    off-loading processing of said local security policies and end-to-end encryption from an operating system of a compute platform to an network interface communicatively coupled to said compute platform (215);
    identifying interesting traffic for said network interface by an instrumentation management system (220) and;
    transmitting forensic logging from said network interface to said security management station 210.

8. The method of claim 7, further comprising: authenticating said network interface via a protocol by said security management station (225), wherein said protocol is reliably connected.

9. The method of claim 7, further comprising: issuing commands to said network interface, wherein said commands are based on said identified interesting traffic (230).

10. The method of claim 7, further comprising: collecting individual data streams from a plurality of compute platforms at said instrumentation management system (235).

11. The method of claim 10, further comprising: coalescing said individual data streams from said plurality of compute platforms, wherein said coalesced individual data streams are suitable for storage in an archive for analysis (240).

12. The method of claim 7, further comprising: allowing authorized bypass of individual packets within said network interface (245).

* * * * *